United States Patent
Morris

(10) Patent No.: US 8,116,532 B2
(45) Date of Patent: Feb. 14, 2012

(54) EXTRACTION OF PROCESSED BOREHOLE IMAGE ELEMENTS TO CREATE A COMBINED IMAGE

(75) Inventor: Stephen A. Morris, Aberdeenshire (DE)

(73) Assignee: Baker Hughes Incorporated, Houston, TX (US)

( * ) Notice: Subject to any disclaimer, the term of this patent is extended or adjusted under 35 U.S.C. 154(b) by 817 days.

(21) Appl. No.: 12/192,555

(22) Filed: Aug. 15, 2008

(65) Prior Publication Data
US 2010/0040259 A1 Feb. 18, 2010

(51) Int. Cl.
*G06K 9/00* (2006.01)
*G06K 9/36* (2006.01)

(52) U.S. Cl. ............ 382/109; 382/284; 73/152.01; 367/25; 367/86

(58) Field of Classification Search .......... 382/109, 382/284; 348/85; 73/152.01–152.62; 367/25–35, 367/81, 82, 86
See application file for complete search history.

(56) References Cited

U.S. PATENT DOCUMENTS

| | | | |
|---|---|---|---|
| 5,420,637 A | 5/1995 | Zeevi et al. | |
| 5,446,804 A | 8/1995 | Allebach et al. | |
| 5,502,686 A | 3/1996 | Dory et al. | |
| 5,504,847 A | 4/1996 | Kimura et al. | |
| 5,661,824 A | 8/1997 | Allebach et al. | |
| 6,253,848 B1 | 7/2001 | Reimers et al. | |
| 6,580,937 B2 | 6/2003 | Ho et al. | |
| 6,816,787 B2 | 11/2004 | Ramamoorthy et al. | |
| 7,023,454 B1 | 4/2006 | Knight | |
| 7,346,454 B2 * | 3/2008 | Mathieu et al. | 702/6 |
| 2003/0156739 A1 * | 8/2003 | Hinton et al. | 382/109 |
| 2005/0264668 A1 | 12/2005 | Miyamoto | |
| 2006/0190178 A1 | 8/2006 | Zamora et al. | |
| 2009/0167556 A1 * | 7/2009 | Signer et al. | 340/853.1 |

FOREIGN PATENT DOCUMENTS
EP 1016883 A1 5/2000

OTHER PUBLICATIONS

Atwood, G.H., et al. "Image Expansion Using Interpolation & Heuristic Edge Following". Third International Conference on Image Processing and Its Application. Jul. 18-20, 1989. pp. 664-668.
International Search Report and Written Opinion, Mailed Mar. 24, 2010, International Appln. No. PCT/US2009/053638, Written Opinion 8 pages, International Search Report 7 pages.

* cited by examiner

*Primary Examiner* — Jon Chang
(74) *Attorney, Agent, or Firm* — Cantor Colburn LLP

(57) ABSTRACT

A method for imaging a subsurface material, the method including: receiving a first image of the subsurface material and a second image of the subsurface material, the first image displaying a first property of the subsurface material and the second image displaying a second property of the subsurface material wherein the first property is different from the second property; and combining the first image and the second image to create a combined image. A system and computer program product are also disclosed.

20 Claims, 6 Drawing Sheets

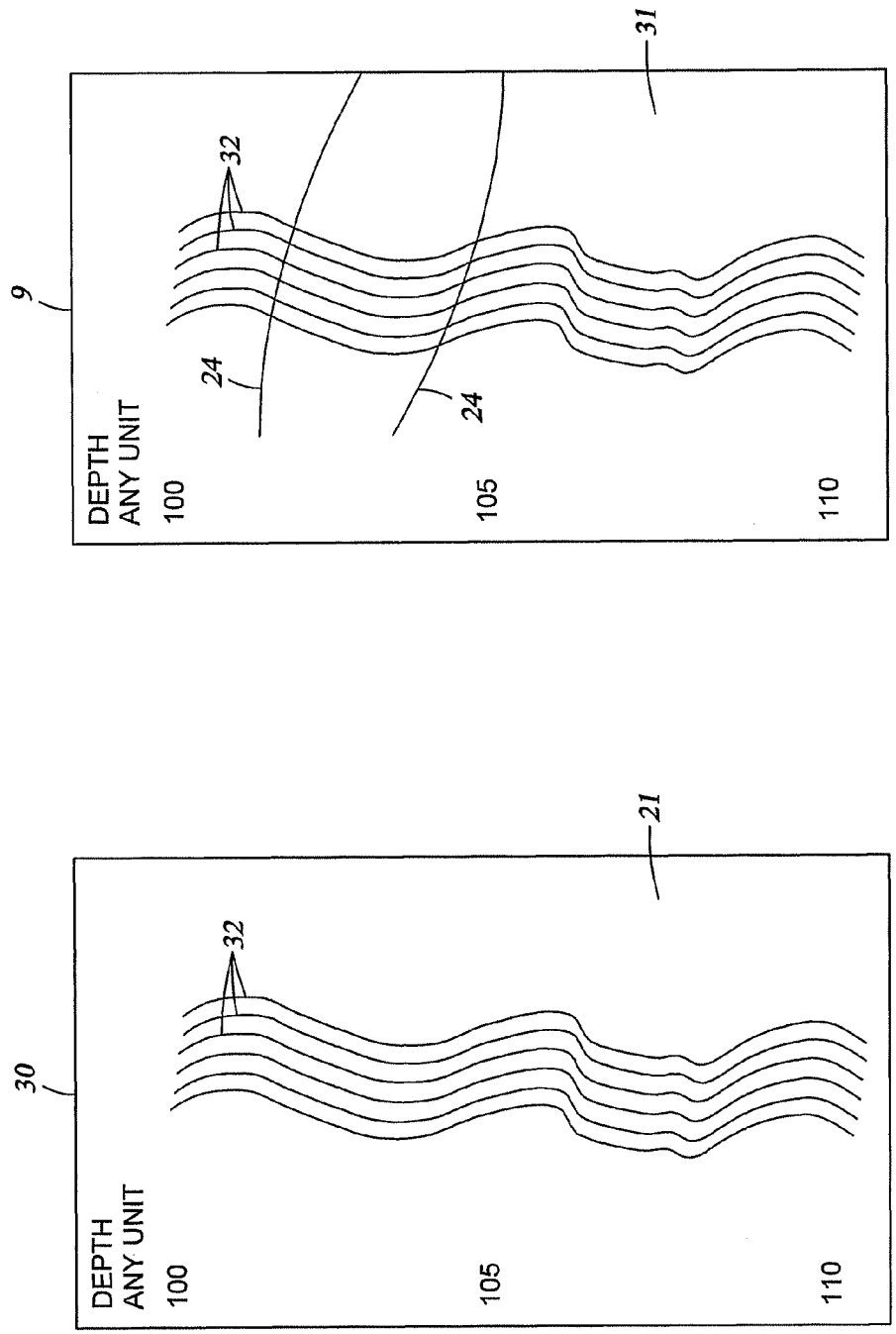

EXTRACTION OF PROCESSED BOREHOLE IMAGE ELEMENTS TO CREATE A COMBINED IMAGE

BACKGROUND OF THE INVENTION

1. Field of the Invention

The invention disclosed herein relates to imaging a formation and, in particular, to a technique for presenting an image of the formation.

2. Description of the Related Art

Efficient exploration and production of hydrocarbons requires detailed information about properties of geological formations that may contain reservoirs for hydrocarbons. To obtain the information, a borehole may be drilled through the earth and into a formation. A logging tool or tools can be disposed into the borehole to perform measurements of the properties at various depths. Generally, many types of measurements are performed in order for a petroanalyst to accurately analyze the formation.

Depending on the types of measurements, a visual image of the formation can be created for the depths at which the measurements were performed. Resistivity measurements of the formation are one example of measurements that can be used to create the visual image. The petroanalyst can analyze visual images to gain an understanding of the characteristics of the formation.

Other types of measurements may not lend themselves to creating a detailed visual image but may be best presented as a lower resolution image, a graph, or a color display. Faced with the many types of measurements and the many different presentations of the measurements, the petroanalyst can be challenged to correctly and efficiently characterize the formation.

Therefore, what are needed are techniques for efficiently presenting different types of formation data to a petroanalyst. Preferably, the techniques include visual images.

BRIEF SUMMARY OF THE INVENTION

Disclosed is a method for imaging a subsurface material, the method including: receiving a first image of the subsurface material and a second image of the subsurface material, the first image displaying a first property of the subsurface material and the second image displaying a second property of the subsurface material wherein the first property is different from the second property; and combining the first image and the second image to create a combined image.

Also disclosed is a system for imaging subsurface material, the system including: a processing unit configured to combine a first image of the subsurface material and a second image of the subsurface material to create a combined image, the first image displaying a first property of the subsurface material and the second image displaying a second property of the subsurface material wherein the first property is different from the second property.

Further disclosed is a computer program product stored on machine-readable media for imaging a subsurface material, the product having machine-executable instructions for: receiving a first image of the subsurface material and a second image of the subsurface material, the first image displaying a first property of the subsurface material and the second image displaying a second property of the subsurface material wherein the first property is different from the second property; combining the first image and the second image to create a combined image; and displaying the combined image to a user.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 3 depicts aspects of another image of the subsurface material;

FIG. 4 illustrates an exemplary embodiment of a combined image of the subsurface material;

DETAILED DESCRIPTION OF THE INVENTION

Figure 1:
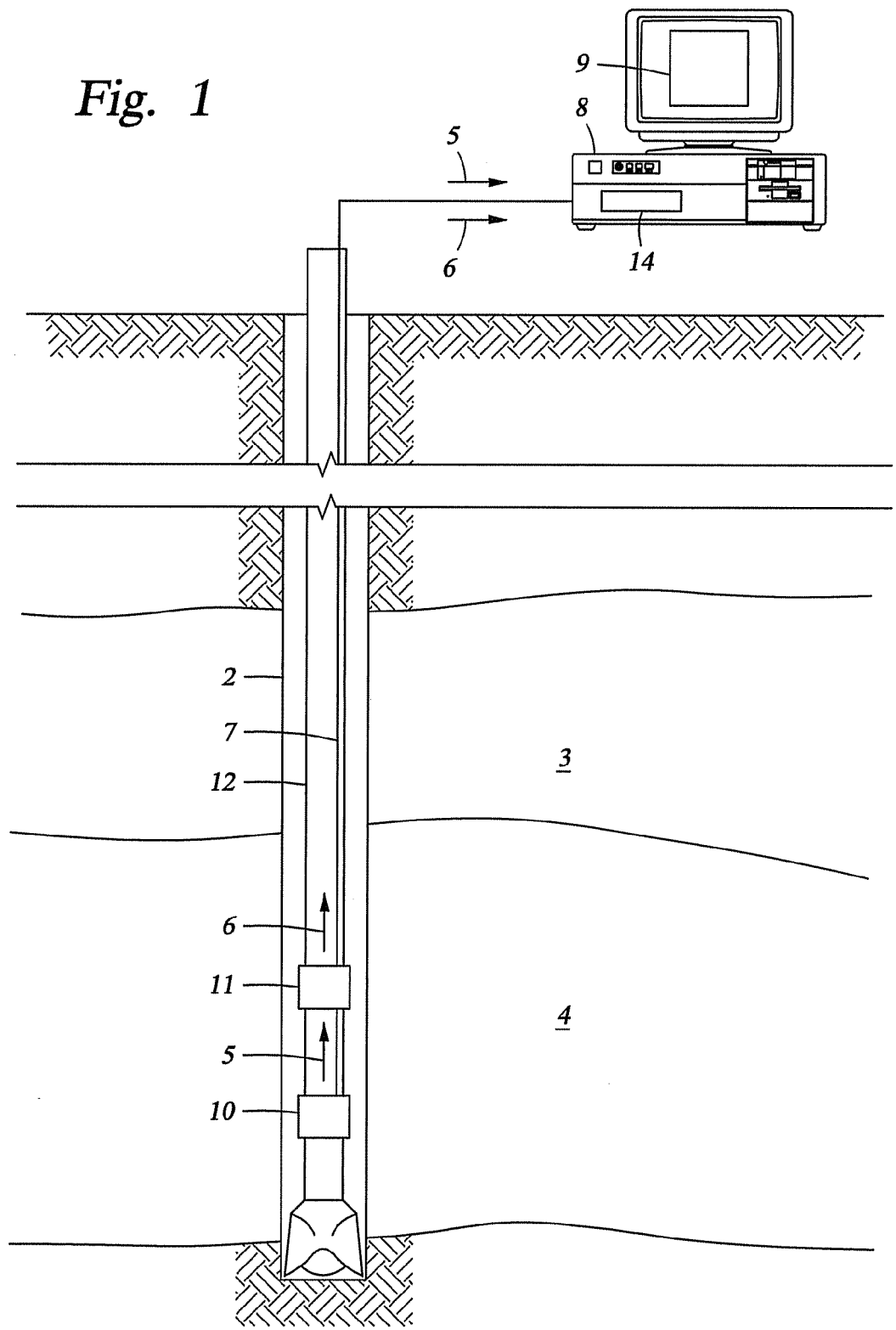
FIG. 1 depicts an exemplary embodiment of two logging instruments disposed in a borehole penetrating the earth.

Disclosed are techniques for displaying images related to at least two different collections of data obtained from measurements of a subsurface material. Each collection of data is obtained using different measurement methods or using the same method with different parameters. That is, each of the images displays a property of the subsurface material that is different from the property displayed by the other images. The measurements are generally performed by at least one logging instrument disposed in a borehole. Each collection of data can be displayed as an image that can be viewed by an operator or petroanalyst. Depending on the measurements, the image corresponds to a depth or a range of depths at which the measurements were performed.

The techniques, which include methods and apparatus, call for superimposing a property extracted from a first image (obtained from a first collection of data) over a second image (obtained from a second collection of data) to create a combined image. The property is displayed in the form of an image and is referred to as a "property image" or "property map." The property image may not be evident by viewing the first image. Thus, extracting the property image can make the property image evident by viewing. The second image can be the image formed from the second collection of data or by extracting a property from the second collection of data. Any image derived from a collection of data without extraction of a property is referred to as a "processed starting image." Thus, the combined image can be formed by using various combinations of property maps and/or processed starting images derived from the first and second collections of data. In some embodiments, the property map and a processed starting image can be obtained from one collection of data and combined to form the combined image.

In a preferred embodiment, the first image has higher resolution than the second image. However, the teachings are also applicable to the second image having a resolution equal to or greater than the first image. The second image in one embodiment can be a color representation of the second collection of data. The combined image with the color second image can result in the "fabric" of the first image being superimposed over the color display of the second image. The benefit of the combined image is that the combined image displays more information than either the first image or the second image individually.

Before the techniques are discussed in detail, certain definitions are provided. The term "image" relates to a visual display of a collection of data obtained through a measurement or measurements in a borehole of a subsurface material. The collection of data is generally displayed as an indication on a background. Because the borehole wall is generally cylindrical, the visual display may be thought of as a cylindrical picture as it would appear if it were unrolled onto a flat surface. Generally, the image corresponds to a range of depths at which the measurements were performed. The term "fabric" relates to indications or events of one color displayed against a contrasting background color in an image. The term "edge map" relates to a collection of points that define an edge of an indication in an image. In general, the collection of points when plotted results in a line. The line represents the "fabric" of the image discussed above. In one embodiment, the edge map may be a shaded relief image that emphasizes areas of high slope in the data. In addition, the edge map can be obtained in at least one of a vertical direction and a horizontal direction.

The term "subsurface material" relates to material beneath the surface of the earth that is penetrated by a borehole. The subsurface material can include a geologic formation. The term "different types of measurement" relates to two or more measurements of properties of subsurface material wherein each measurement measures either a different property (i.e., resistivity versus gamma ray spectrum) or the same property with different measurement parameters (i.e., measuring resistivity with different voltage settings). The different types of measurements result in measuring different properties of the subsurface material.

Turning now to the techniques, FIG. 1 illustrates an exemplary embodiment of a first logging instrument 10 and a second logging instrument 11 disposed in a borehole 2 penetrating the earth 3. The earth 3 includes subsurface material 4, which can be a formation 4. In the embodiment of FIG. 1, the first logging instrument 10 and the second logging instrument 11 are disposed in a collar affixed to a drill string 12. The first logging instrument 10 and the second logging instrument 11 each perform a different type of measurement of the subsurface materials 4. Examples of measurements performed by the logging instruments 10 and 11 include resistivity, nuclear magnetic resonance, gamma radiation and acoustic. In the embodiment of FIG. 1, a measurement from the first logging instruments 10 and a measurement from the second logging instrument 11 are transmitted to the surface of the earth as data 5 and data 6, respectively, using a broadband communications system 7. Other methods may also be used to transmit the data 5 and the data 6 such as acoustic transmission and mud-pulse telemetry. Alternatively, at least one of the data 5 and the data 6 may be stored in memory located at the drill string 12 and retrieved when the drill string 12 is removed from the borehole 2.

Referring to FIG. 1, a processing unit 8 receives the data 5 and the data 6 and processes the data 5 and 6 to display a combined image 9. In the embodiment of FIG. 1, the processing unit 8 can display the combined image 9 in real time using the broadband communication system 7. Alternatively, the processing unit 8 can process the data 5 and the data 6 that were previously recorded to display the combined image 9.

The first logging instrument 10 and the second logging instrument 11 depicted in FIG. 1 are configured for logging-while-drilling (LWD) applications. The techniques disclosed herein are also suitable for wireline logging applications. During wireline logging operations, a logging instrument is generally lowered into and withdrawn from the borehole 2 by use of an armored electrical cable or similar conveyance as is known in the art.

Figure 2B:
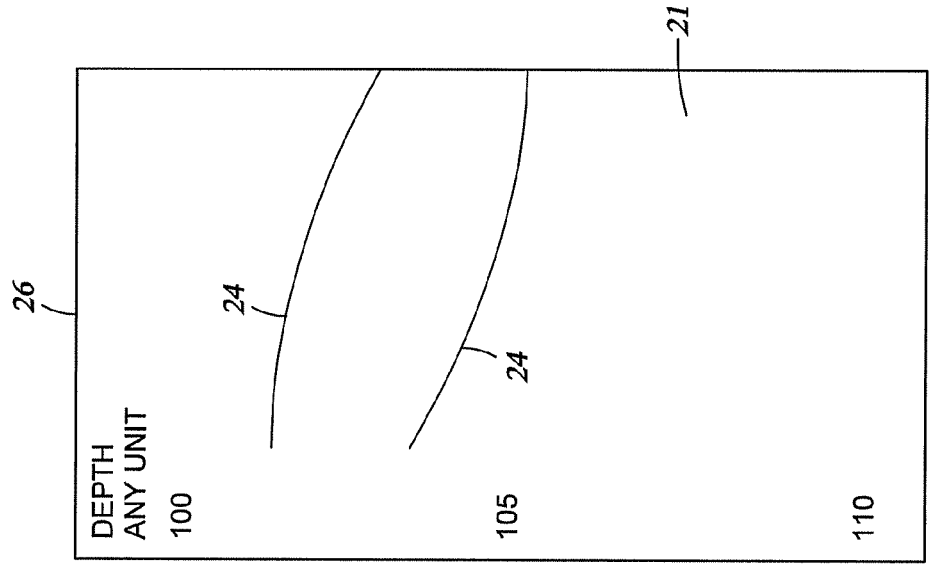
FIG. 2A and FIG. 2B, collectively referred to herein as FIG. 2, depict aspects of an image derived from a measurement of subsurface material.
Figure 2A:
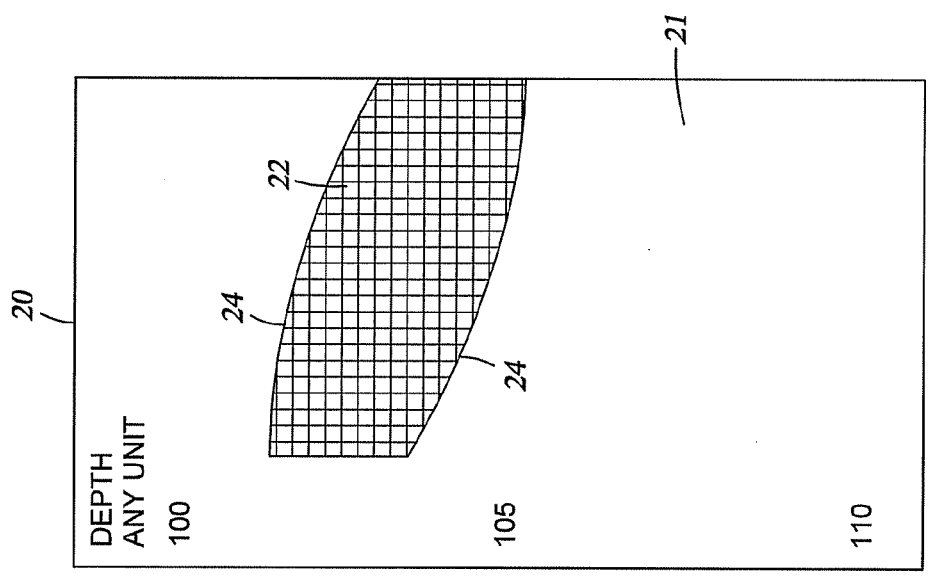

Turning now to embodiments of techniques for creating the combined image 9, FIG. 2 illustrates an exemplary embodiment of a first image 20 obtained from the data 5. Referring to FIG. 2A, the first image 20 includes an indication 22 displayed against a background 21. Referring to FIG. 2A, the indication 22 includes an edge 24. The edge 24 is a collection of points defining a boundary between the indication 22 and the background 21. Referring to FIG. 2B, an edge map 26 is derived from the edges 24. The edge map 26 represents a property extracted from the data 5 and, therefore, may be considered as an embodiment of a property map 26.

The edge map 26 may be extracted from the first image 20 using several techniques. One example of an edge detection technique is a Canny edge detection algorithm. Another example is a zero-crossing algorithm that searches for zero-crossings in a second-order derivative expression computed from the first image 20. In addition, another example includes assigning a value of 1 to small sections of the first image 20 that include the edge 24. The remaining sections that do not include the edge 24 are assigned a value of 0. Thus, the edge map 26 can be formed by plotting only those sections with a value of 1.

FIG. 3 illustrates an exemplary embodiment of a second image 30 obtained from the data 6. The second image 30 includes an indication 32 against a background 31. The indication 32 can be in a selected color or colors (i.e., color other than black or white) or in grey-scale.

FIG. 4 illustrates an exemplary embodiment of the combined image 9. The combined image 9 in the embodiment of FIG. 4 may be referred to as a fabric overlay 9. The fabric overlay 9 is created by superimposing the edge map 26 over the second image 30. In one embodiment, image data used to create the edge map 26 and image data used to create the second image 30 may be combined seamlessly by the processing unit 8. The image data may be processed to display the edge map 26 and to display areas of the second image 30 that do not correspond to or overlap the edges of the edge map 26.

In one embodiment, one collection of data (the data 5 for example) may be used to create the fabric overlay 9. The edgemap 20 and associated property of the subsurface material 4 may not be readily apparent by viewing the first image 20. In this embodiment, the edgemap 26 can be emphasized and overlayed over the first image 20. The result of this embodiment is being able to view the property associated with the edgemap 26 together with a different property associated with the first image 20.

Figure 5:
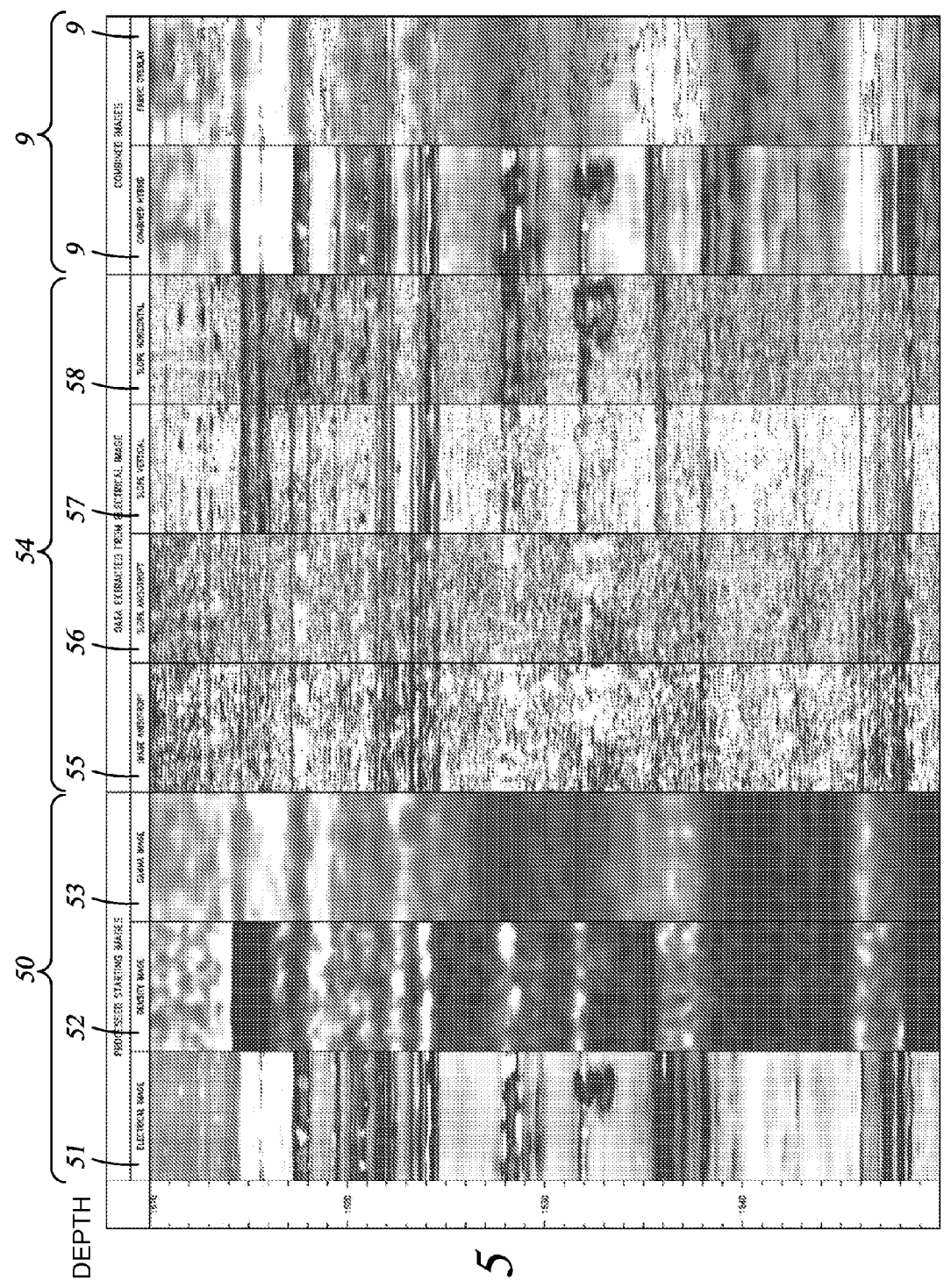
FIG. 5 illustrates examples of various processed starting images, various properties that may be extracted from an electrical image, and various combined images.

As discussed above, various combinations of property maps 26 and/or processed starting images derived from the data 5 and the data 6 can be used to form the combined image 9. FIG. 5 presents examples of various processed starting images 50. The processed starting images 50 include an electrical image 51, a density image 52, and a gamma image 53. FIG. 5 also shows various properties 54 that may be extracted from the electrical image 51. The various properties 54 disclosed in FIG. 5 are non-limiting and other properties may be found and extracted. The properties 54 include image anisotropy 55, slope anisotropy 56, slope vertical 57, and slope horizontal 58. FIG. 5 illustrates several combined images 9. The combined images 9 in FIG. 5 include a combined hybrid 9 and the fabric overlay 9. The combined hybrid 9 shows the summation of three processed starting images 50 with various weighting factors. Making up in the combined hybrid 9 are the electrical image 51 with a weighting factor of 0.5, the density image 52 with a weighting factor of 0.15, and the gamma image 53 with a weighting factor of 0.35. The fabric overlay 9 is produced by overlaying the fabric derived from the electrical image 51 over the gamma image 53. In the fabric overlay 9, the bright tones in the fabric are transparent and darker tones mask the overlain portions of the gamma image 53.

Figure 6:
FIG. 6 illustrates a example of extracting an edgemap vertical and an edgemap horizontal from an electrical image and combining the edgemaps to produce an embossed image.

FIG. 6 illustrates the results of extracting an edgemap vertical 26 and an edgemap horizontal 26 from the electrical image 51. Referring to FIG. 6, an embossed image 9 (an embodiment of the combined image 9) is generated by overlaying the edgemap vertical 26 and the edgemap horizontal 26 over the electrical image 51. The two edgemaps 26 are set to have transparency (normally set to high values such as 70% for both). The resulting embossed image 9 has a three-dimensional look to it that makes low values (dark tones) appear recessed and high values (light tones) appear to standout. The embossed image 9 makes some features from the electrical image 51 that may not have been apparent before, visible with little diminishing of overall image quality.

Turning now to the broadband communication system 7, the broadband communication system 7 provides the data 5 and the data 6 to the processing unit 8 in real time. As used herein, the term "real time" relates to communicating the data 5 and the data 6 to the processing unit 8 and the processing unit 8 displaying the combined image 9 to a user in a time period short enough for the user to make a decision governing a process being conducted downhole. Examples of the process include drilling or logging. Thus, transmission of the data 5 and the data 6 in "real-time" is taken to mean transmission of the data 5 and the data 6 at a speed that is useful or adequate for the user to make the decision. Accordingly, it should be recognized that "real-time" is to be taken in context, and does not necessarily indicate the instantaneous transmission of the data 5 and the data 6 or instantaneous display of the combined image 9. An example of the broadband communication system 6 is a communication system using a fiber optic or "wired pipe."

In one embodiment of wired pipe, a drill pipe is modified to include a broadband cable protected by a reinforced steel casing. At the end of each drill pipe, there is an inductive coil, which contributes to communication between two drill pipes. In this embodiment, the broadband cable is used to transmit the data 5 and the data 6. About every 500 meters, a signal amplifier is disposed in operable communication with the broadband cable to amplify the communication signal to account for signal loss.

One example of wired pipe is INTELLIPIPE® commercially available from Intellipipe of Provo, Utah, a division of Grant Prideco. One example of the broadband communication system 7 using wired pipe is the INTELLISERV® NETWORK also available from Grant Prideco. The Intelliserv Network has data transfer rates from fifty-seven thousand bits per second to one million bits per second or more. The broadband communication system 7 enables sampling rates of the first logging instrument 10 and the second logging instrument 11 at up to 200 Hz or higher with each sample being transmitted to the processing unit 8 at a location remote from the logging instruments 10 and 11.

Turning now to the processing unit 8, the processing unit 8 may include a computer processing system. Exemplary components of the computer processing system include, without limitation, at least one processor, storage, memory, input devices (such as a keyboard and mouse), output devices (such as a display and a recording device) and the like. As these components are known to those skilled in the art, these are not depicted in any detail herein.

Generally, some of the teachings herein are reduced to an algorithm 14, shown in FIG. 1 that is stored on machine-readable media. The algorithm 14 is implemented by the processing unit 8 and provides as user with the combined image 9.

Figure 7:
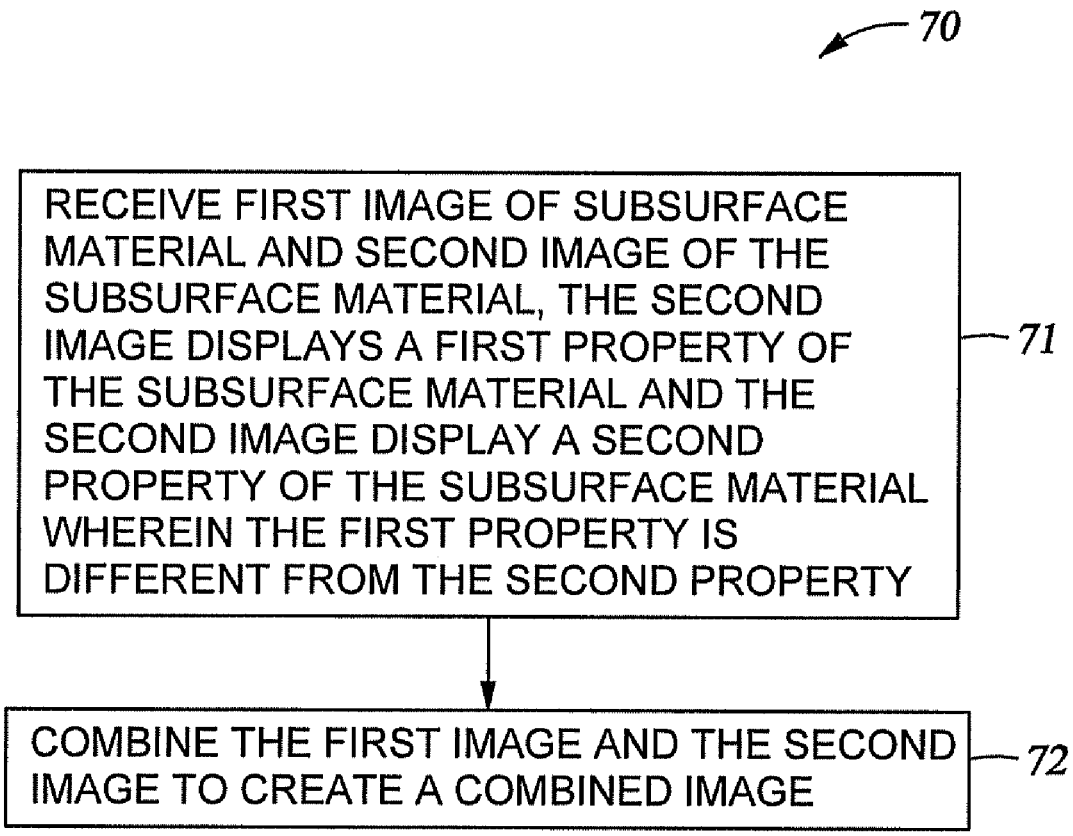
FIG. 7 presents an example of a method for imaging the subsurface material.

FIG. 7 presents one example of a method 70 for imaging the subsurface material 4. The method 70 calls for (step 71) receiving the first image 20 and the second image 30. The first image 20 displaying a first property of the subsurface material 4 and the second image 30 displaying a second property of the subsurface material 4, wherein the first property is different from the second property. Further, the method 70 calls for (step 72) combining the first image 20 and the second image 30 to create the combined image 9. In one embodiment, step 71 can include receiving the data 5 from the first logging instrument 10 to produce the first image 20 and receiving the data 6 from the second logging instrument 11 to produce the second image 30. Step 72 can also include adjusting the size of the second image 30 to coordinate with the first image 20. In general, the adjusting includes "lining up" the depths displayed in the second image 30 with the depths displayed in the first image 20. "Up-sampling" can be used for adjusting the second image 30. Up-sampling relates to increasing the resolution of the second image 30 by creating additional indication points and smoothing a curve created by the additional indication points. Alternatively, "down-sampling" can be used for adjusting the second image 30. Down-sampling relates to decreasing the resolution of the second image 30 by deleting indication points and smoothing a curve resulting from the remaining indication points.

In the embodiment discussed above, the first logging instrument 10 provides the first image 20 and the second logging instrument 30 provides the second image 30. In another embodiment, one logging instrument can be used to provide the first image 20 and the second image 30. In the embodiment of one logging instrument, the one logging instrument can be configured to provide the different types of measurements related to the first image 20 and the second image 30. Further, in the embodiment of one logging instrument, one data set (the data 5 for example) can be processed to extract several types of property maps 26 that can be superimposed over the first image 20.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements. The terms "first" and "second" are used to distinguish elements and do not denote any particular order.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for imaging a subsurface material, the method comprising:
receiving a first image of the subsurface material and a second image of the subsurface material wherein the first image comprises a resolution higher than a resolution of the second image, the first image displaying a first property of the subsurface material and the second image displaying a second property of the subsurface material wherein the first property is different from the second property;
increasing the resolution of the second image by creating additional indication points and smoothing a curve created by the additional indication points; and
combining the first image and the increased resolution second image to create a combined image.

2. The method as in claim 1, wherein the combining comprises superimposing the first image over the second image.

3. The method as in claim 1, further comprising extracting a property map from at least one of the first image and the second image and using the property map for the at least one of the first image and the second image in the combining.

4. The method of claim 3, wherein the property map comprises an edge map.

5. The method of claim 4, wherein extracting comprises using at least one of a Canny edge detection algorithm and a zero crossing algorithm.

6. The method of claim 4, wherein extracting comprises:
assigning a first value to sections of the first image that include an edge of an indication displayed upon a background in the first image;
assigning another value to remaining sections of the first image; and
creating the edge map with the sections assigned the first value.

7. The method of claim 3, wherein the property map comprises at least one of image anisotropy, slope anisotropy, slope vertical, and slope horizontal.

8. The method of claim 1, wherein the first image comprises a first weighting factor and the second image comprises a second weighting factor, the weighting factors indicating a relative amount of intensity for each image in the combined image.

9. The method of claim 1, further comprising:
collecting the first image; and
collecting the second image;
wherein collecting the first image and collecting the second image comprises performing at least one of resistivity measurements, gamma radiation measurements, acoustic measurements, and nuclear magnetic resonance measurements.

10. The method of claim 1, further comprising displaying the combined image in real time.

11. The method of claim 1, wherein at least one of the first image and the second image comprises a color.

12. The method of claim 1, further comprising adjusting the size of the second image to match the size of the first image.

13. The method of claim 1, wherein a depth corresponding to the first image is substantially the same as the depth corresponding to the second image.

14. The method of claim 1, wherein data for the first image and data for the second image are collected from at least one of a first logging instrument and a second logging instrument.

15. A system for imaging subsurface material, the system comprising:
a processing unit configured for:
receiving a first image of the subsurface material and a second image of the subsurface material wherein the first image comprises a resolution higher than a resolution of the second image, the first image displaying a first property of the subsurface material and the second image displaying a second property of the subsurface material wherein the first property is different from the second property;
increasing the resolution of the second image by creating additional indication points and smoothing a curve created by the additional indication points; and
combining the first image and the increased resolution second image to create a combined image.

16. The system as in claim 15, wherein the processing unit is further configured to extract a property map from at least one of the first image and the second image.

17. The system of claim 15, further comprising at least one logging instrument configured to provide data for producing at least one of the first image and the second image.

18. The system of claim 17, wherein the at least one logging instrument is configured to measure at least one of resistivity, acoustic waves, gamma radiation, and nuclear magnetic resonance.

19. The system of claim 15, further comprising a broadband communication system in operable communication with the at least one logging instrument and the processing unit.

20. A computer program product stored on a non-transitory machine-readable medium for imaging a subsurface material, the product comprising machine-executable instructions for:

receiving a first image of the subsurface material and a second image of the subsurface material wherein the first image comprises a resolution higher than a resolution of the second image, the first image displaying a first property of the subsurface material and the second image displaying a second property of the subsurface material wherein the first property is different from the second property;

increasing the resolution of the second image by creating additional indication points and smoothing a curve created by the additional indication points;

combining the first image and the increased resolution second image to create a combined image; and displaying the combined image to a user.

* * * * *